United States Patent
Wu et al.

(10) Patent No.: US 10,423,742 B2
(45) Date of Patent: Sep. 24, 2019

(54) METHOD TO PERFORM FULL ACCURACY HIERARCHICAL BLOCK LEVEL TIMING ANALYSIS WITH PARAMETERIZED CHIP LEVEL CONTEXTS

(71) Applicant: Synopsys, Inc., Mountain View, CA (US)

(72) Inventors: Qiuyang Wu, Portland, OR (US); Martin Ranke, Sunnyvale, CA (US); Min Li, Fremont, CA (US)

(73) Assignee: Synopsys, Inc., Mountain View, CA (US)

(*) Notice: Subject to any disclaimer, the term of this patent is extended or adjusted under 35 U.S.C. 154(b) by 17 days.

(21) Appl. No.: 15/414,618

(22) Filed: Jan. 24, 2017

(65) Prior Publication Data
US 2018/0210986 A1 Jul. 26, 2018

(51) Int. Cl.
*G06F 9/455* (2018.01)
*G06F 17/50* (2006.01)

(52) U.S. Cl.
CPC ........ *G06F 17/5031* (2013.01); *G06F 17/504* (2013.01); *G06F 2217/84* (2013.01)

(58) Field of Classification Search
USPC ........ 716/106, 108, 109, 111, 113, 132, 133, 716/134
See application file for complete search history.

(56) References Cited

U.S. PATENT DOCUMENTS

| | | | |
|---|---|---|---|
| 7,957,949 B1 * | 6/2011 | Subasic | G06F 17/5045 703/13 |
| 8,504,978 B1 * | 8/2013 | Bhardwaj | G06F 17/5036 716/106 |
| 8,640,066 B1 * | 1/2014 | Gupta | G06F 17/505 716/102 |
| 8,701,075 B2 | 4/2014 | Dartu et al. | |
| 8,818,784 B1 * | 8/2014 | Rubero | G06F 17/5022 703/14 |
| 8,977,995 B1 * | 3/2015 | Arora | G06F 17/505 716/105 |
| 2017/0024502 A1 * | 1/2017 | Jallepalli | G06F 17/5036 |

OTHER PUBLICATIONS

R. Sivakumar, et al., "A Comprehensive Solution for True Hierarchical Timing and Crosstalk Delay Signoff", International Conference on VLSI Design, 2006, vol. 00, No., pp. 277-282.

* cited by examiner

*Primary Examiner* — Brian Ngo
(74) *Attorney, Agent, or Firm* — HIPLegal LLP; Judith Szepesi (57) ABSTRACT

A method and apparatus for on chip variation path-based pessimism reduction and improving analysis of a hierarchical integrated circuit design in an electrical circuit. The circuit has one or more block circuit levels and a top circuit level. The method in one embodiment comprises characterizing the top circuit level to produce a context function, the context function used by the block circuit level for evaluation.

21 Claims, 11 Drawing Sheets

METHOD TO PERFORM FULL ACCURACY HIERARCHICAL BLOCK LEVEL TIMING ANALYSIS WITH PARAMETERIZED CHIP LEVEL CONTEXTS

FIELD

The present disclosure relates generally to electronic design automation, and in particular to pessimism reduction in a hierarchical integrated circuit design

BACKGROUND

Some of the most complicated devices engineered by man are semiconductor integrated circuits. Some circuits such as microprocessors may include a billion transistors or more, and are getting more complicated in their design every year. As a result, testing throughout the design and manufacturing processes is necessary to be able to reliably manufacture these semiconductor integrated circuits. This includes testing of circuit designs, testing of layout designs derived from the circuit designs, and testing of the resulting manufactured integrated circuits.

Static timing analysis (STA) is often utilized for performing timing analysis towards validation and optimization of synchronous circuit designs. This allows the designer to make modifications to improve the reliability, efficiency, and/or speed of the circuit design. Pessimism is generally incorporated into STA so that variations in modeling, design and manufacturing are essentially taken into account.

Graph based analysis (GBA, often also referred to as block-based analysis) is a type of STA used to perform worst case analysis of a circuit over all possible input combinations and all possible paths, but not of the logical operation of the circuit. GBA uses pessimism to improve the speed of the analysis. For example, GBA utilizes the worst input slew of all input pins through each logic element, but not the logic operation of the circuit. Further, graph based analysis has significant pessimism, particularly due to the on-chip variation analysis of the clock network topology.

Path based analysis (PBA) is another type of STA used to calculate delays beginning at the input and tracing the path to the output. It is generally less pessimistic than GBA, but is much slower in analyzing circuit designs as each circuit path is analyzed. For example, only the slews of the input pins along a given circuit path are considered in this analysis. However, path based analysis is most often used to sign-off on the most advanced integrated circuit designs. Because most chips designed and integrated hierarchically, a full flat path based analysis closure and optimization is runtime and resource intensive and often time and cost prohibitive.

Currently, to account for design and manufacture variation effects, STA performs on-chip variation (OCV) analysis with two main approaches: 1) margin based advanced on-chip variation (AOCV); and 2) statistical distribution based parametric on-chip variation analysis (POCV).

With either of these approaches, path-based analysis (PBA) of the block level circuit relies on GBA based context data (such as path depths, distances and latency of the top circuit level clock paths), this introduces pessimism to block level analysis, which can be unbounded in theory. Reducing or resolving this pessimism is a major issue in the design, design planning, analysis, verification and optimization of an integrated circuit.

Figure 1:
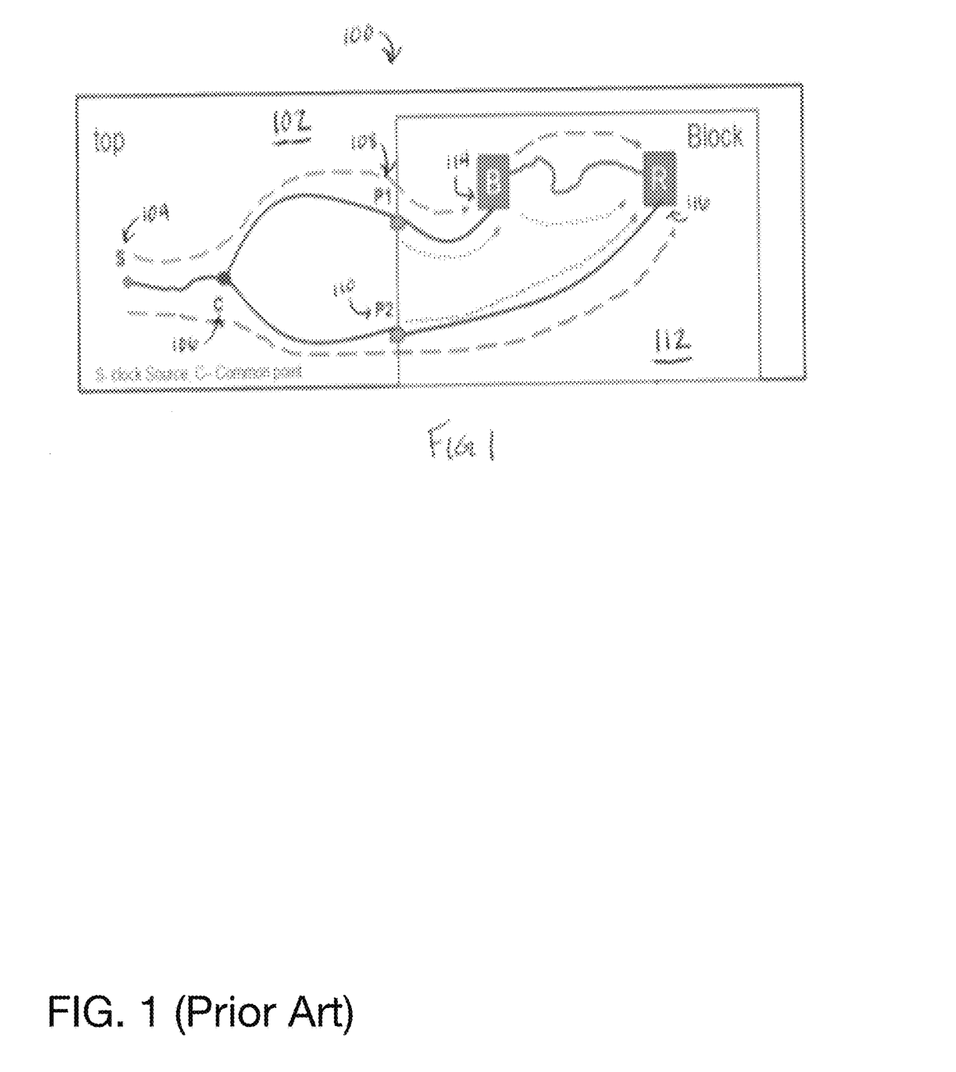
FIG. 1 is an embodiment of a circuit used in a prior art static timing analysis (STA)

FIG. 1 is a block diagram of a prior art static timing analysis (STA) diagram 100 illustrating graph based analysis pessimism and path based analysis pessimism in a traditional flat STA and hierarchical STA. There are multiple causes and components in the pessimism in block level PBA analysis. The pessimism usually occurs in block-level register-to-register paths, and also happen for block interface paths. The method described in this document can be employed to resolve or reduce the pessimism for both categories of timing paths. For ease of illustration and description, our focus in this document focus on the block level internal register-to-register paths which is often more important.

The external pessimism may be produced by GBA merging of signal transition or waveforms at convergence points, or by the graph-based derating of latency computed at the top circuit level 102. The most accurate latency in STA is the PBA derated latency. The max_latency of GBA is usually larger than or equal to the max_latency of PBA, which introduces the pessimism at a top circuit level of the hierarchy.

FIG. 1 illustrates this in top circuit level 102. There are two path segments that illustrate this issue in FIG. 1, top circuit level 102 illustrates the external pessimism issue in path segment, S→C→P1, from clock source 104 to common point 106 to clock port 108 and path segment, S→C→P2, from clock source 104 to common point 106 to clock port 110.

The internal pessimism may come from GBA depth level analysis of the top circuit level 102 that is used for block circuit level 112 OCV analysis. The most accurate analysis for the top circuit level used for block circuit level 112 OCV analysis is the PBA depth. This issue is due to the fact that the GBA depth is always less than or equal to the PBA depth. There are three path segments that illustrate this issue in FIG. 1. Block circuit level 112 illustrates the internal pessimism issue in path segment from clock port 1 108 to buffer 114 (P1→B), in path segment from buffer 114 to register 116 (B→R), and in block circuit level 112 path segments from register 116 to clock port 2 110, (P2→R). These block circuit level path segments are illustrative only.

The issue faced by integrated circuit designers is that nearly all circuits are designed hierarchically and are broken into many blocks. Full chip PBA closure and optimization is computationally intensive and cost prohibitive. The ability to close and optimize at a block level or one or more block circuit levels is key for product design quality and design.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present disclosure presents a method and apparatus for advanced on chip variation path-based pessimism reduction in hierarchical integrated circuit design. The method and apparatus uses a parameterization of context by characterizing the top circuit level as functions of the one or more block circuit levels, such that the top circuit level need not be present for the block circuit level to be designed.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 2A:
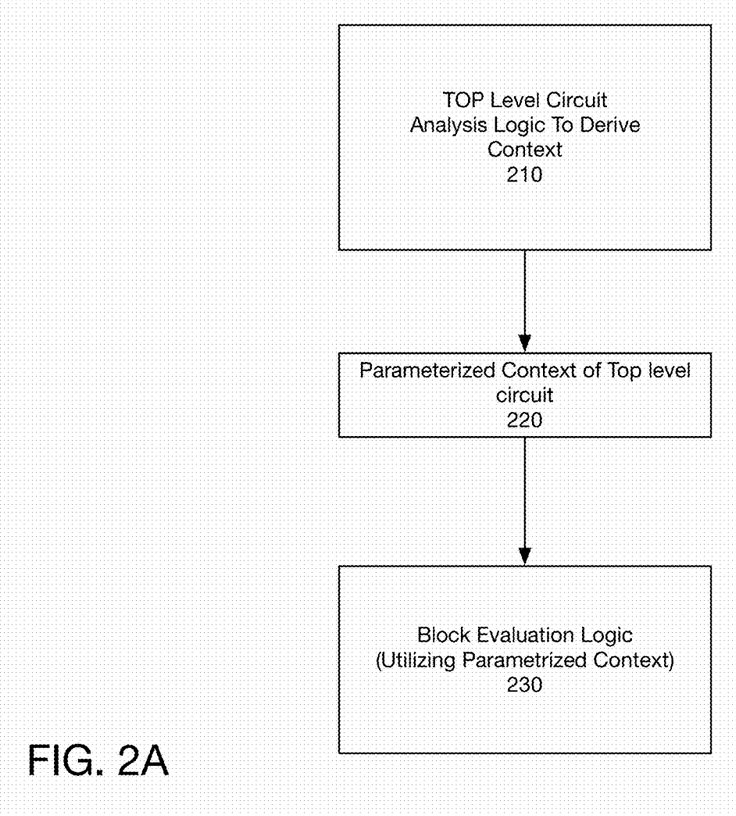
FIG. 2 is an overview block diagram of one embodiment of utilizing parameterized context to reduce pessimism.

FIG. 2A is an overview block diagram of one embodiment of utilizing parameterized context to reduce pessimism. In a hierarchical integrated circuit with a top circuit level and one or more block circuit levels, the top circuit level and block circuit level analysis are mutually dependent. The parameters can be designed for any number of block circuit levels using the characterization of the top circuit level context as functions of the one or more block circuit level parameters. The accurate depth information of top circuit level paths is sent through context to the block circuit levels. Since the top circuit level does not know depths of the block circuit level paths, in one embodiment lookup tables are generated in advance to generate a set of values corresponding to certain depth ranges in the block circuit level. In one embodiment, the latency tables are written to context, and utilized at the blocks for an accurate analysis, accounting for on-chip variation effects. Parameterized context analysis requires passing a small amount of data from the top circuit level to the one or more block circuit levels.

The top level circuit analysis logic 210 reduces the top level circuit to key circuit parameters to be used in the evaluation of a lower level block. This parameterized context 220 is passed on to the block evaluation logic 230. The block evaluation logic 230 utilizes this context in evaluating the block for timing constraints. By including information from the top level circuit, the pessimism in the estimation may be minimized or eliminated. In one embodiment, these key circuit parameters are parameters impacting timing in the block, for timing analysis. However, it should be understood that the reduction of external circuit impact to parameterized context may be used in evaluating noise, power, or other aspects of the block.

Figure 2B:
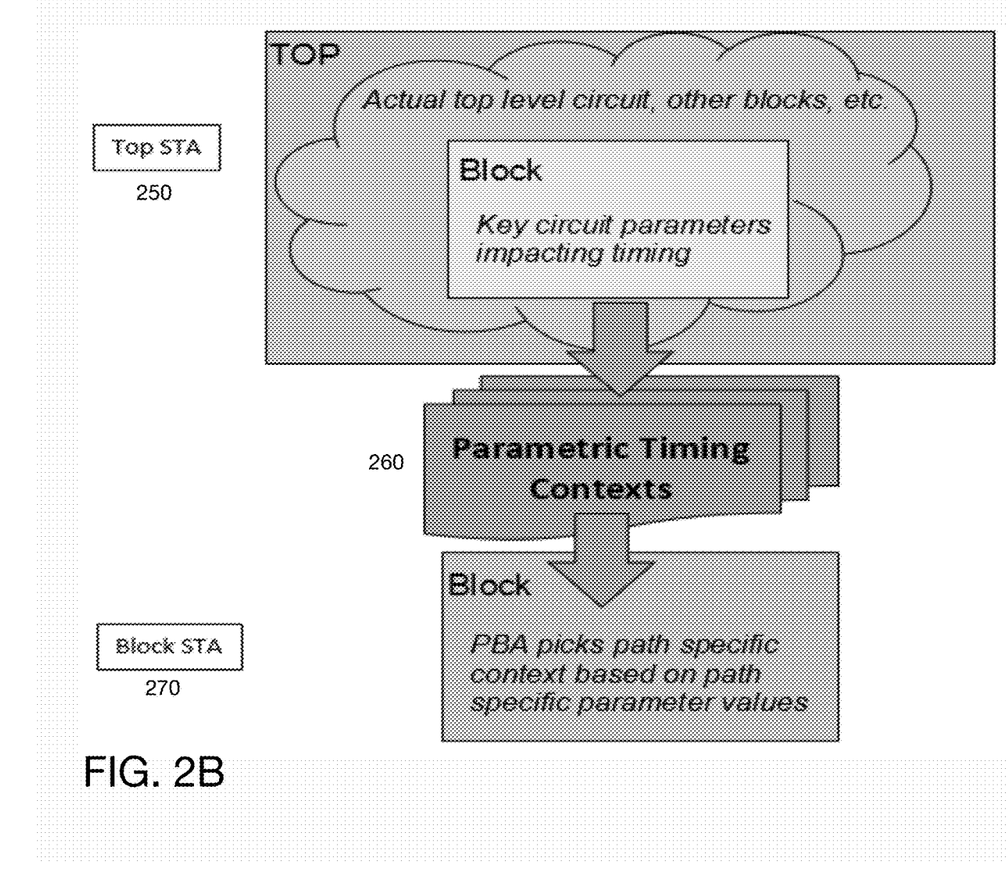
Figure 3A:
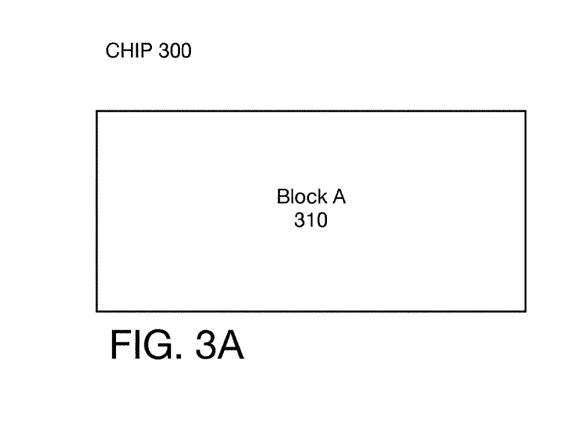
FIGS. 3A-D illustrate embodiments of a multi-hierarchical circuit design.
Figure 3B:
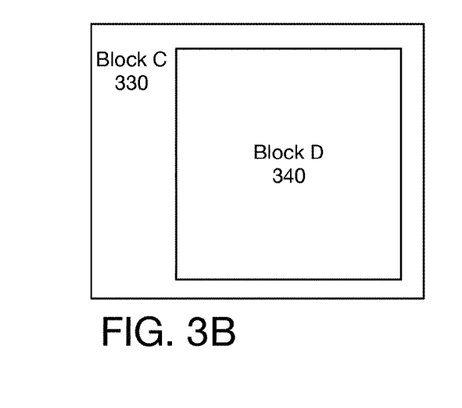
Figure 3C:
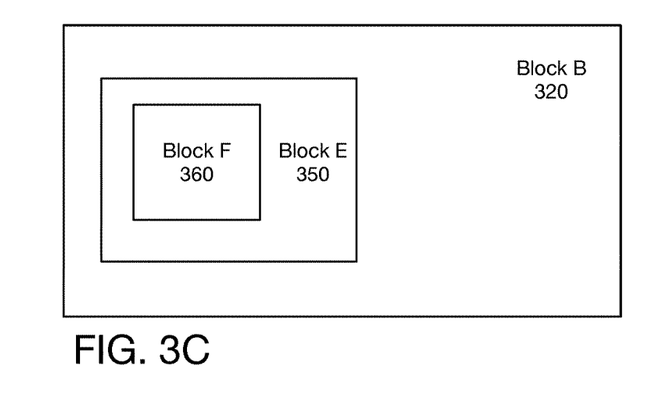
Figure 3D:
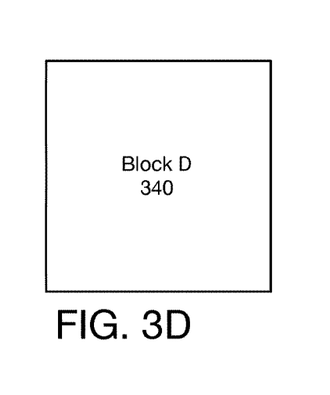

FIG. 2B shows one embodiment of a block diagram of static timing analysis. The top level circuit is 250 is evaluated to identify key circuit parameters that impact timing. These parametric timing contexts 260 are passed to the block. In evaluating the block 270, the PBA picks path specific context based on path specific parameter values. In this way, the analysis of the block has a reduced pessimism but high accuracy, by utilizing the relevant parameters impacting the evaluated aspect of the block in the analysis.

FIGS. 3A-D are block diagrams illustrating a design with multiple hierarchical blocks and also multiple levels of hierarchies. This application refers to immediate levels of hierarchy with a child block (such as block D 340 within block C 330, or Block F 360 within block E 350) as 'block' and parent elements in the hierarchy (such as Block C 330 or block E 350) are referred to as 'top' or 'chip.' However, as can be seen with Blocks B, E, F, a block that is a child (Block E) with respect to a top block (Block B) may in turn be a parent block (Block E 350) with respect to a block lower in the hierarchy (Block F 360). In one embodiment, the method and apparatus described herein may be applicable either recursively or directly or indirectly through and across the design hierarchy levels. For simplicity the present discussion will refer to a "top block" below which there is a "block" which is evaluated. However, it should be understood that the "top block" in one evaluation may become a "block" being evaluated in a subsequent evaluation, and vice versa.

Figure 4:
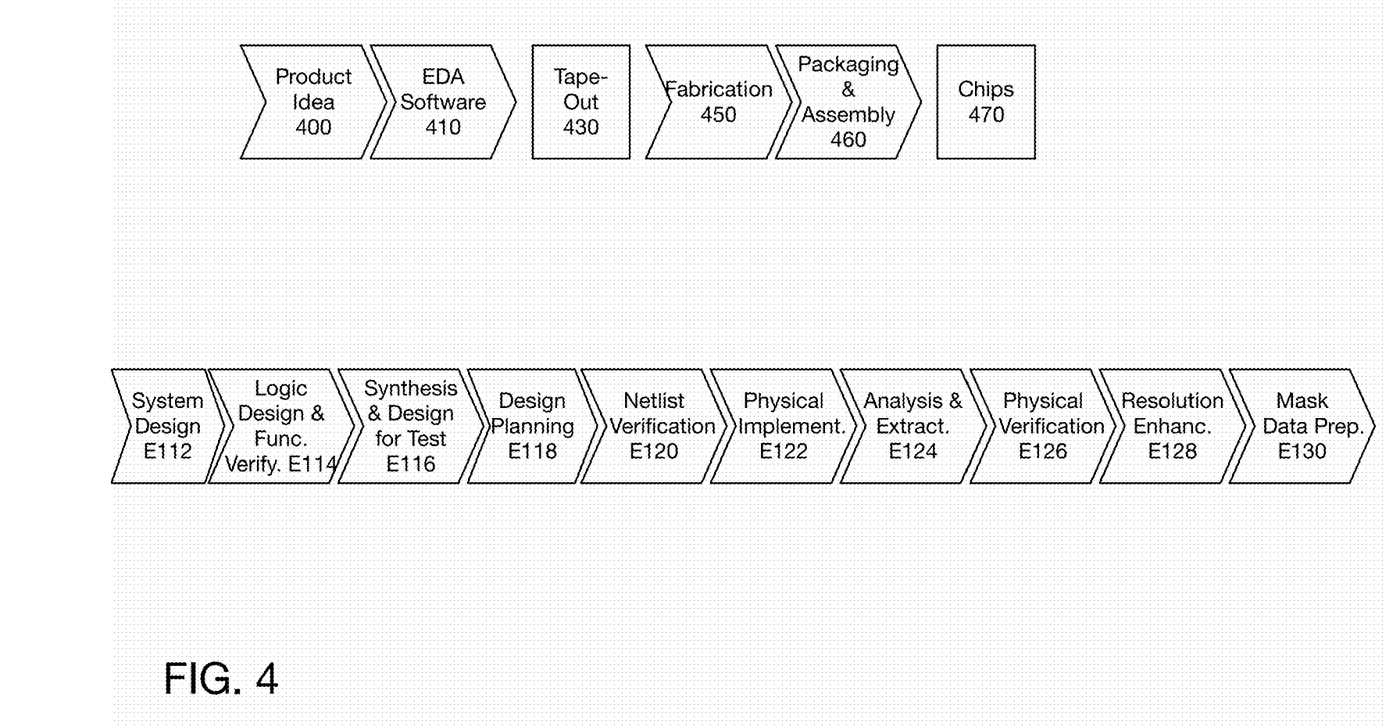
FIG. 4 is a diagram of the design and fabrication of an integrated circuit in which the various embodiments may be implemented.

FIG. 4 is a flow diagram of the design and fabrication of an integrated circuit in which various embodiments may be implemented. The process starts with the generation of a product idea 400, which is developed into a circuit design using electronic design automation (EDA) software design process 410. When the design is finalized, it can be taped-out 430. After tape-out, the circuit is fabricated 450, packaged and assembled 460, resulting in a finished integrated circuit chip 470.

EDA software design process 410 includes multiple steps 412-430, one embodiment of which is described below. Note that this design flow description is for illustration purposes only. This description is not meant to limit the present invention. For example, an actual integrated circuit design may require a designer to perform the design stages in a different sequence than the sequence described herein. The following discussion provides further details of the stages in one embodiment of the design process.

At block E112, the circuit designers describe the functionality to implement in a system design. They can also perform what-if planning to refine the functionality and to check costs. Hardware/software architecture partitioning can occur at this stage. At block E114, referred to as logic design and functional verification, the VHDL or Verilog code for modules in the system is written and the design is checked for functional accuracy. More specifically, the design is checked to ensure that it produces the correct outputs. Then at block E116, the VHDL/Verilog is translated to a netlist. The netlist can be optimized for the target technology. Additionally, tests can be designed and implemented to check the finished chips. At block E118, referred to as design planning, an overall floor plan for the chip is constructed and analyzed for timing and top-level routing.

At block E120, the netlist is verified by checking for compliance with timing constraints and for correspondence with the VHDL/Verilog source code. At block E122, physical implementation is performed with the placement (positioning of circuit elements) and routing (connection of the circuit elements). Additionally the circuit is optimized for area, timing and power goals. At block E124, referred to as analysis and extraction, the circuit function is verified at a transistor level which permits what-if refinement. At block E126, physical verification is performed. In this, timing is typically verified using static timing analysis (STA) and the netlist is checked for compliance with timing constraints and for correspondence with the VHDL/Verilog source code.

Physical verification is performed by checking the design to ensure correctness for manufacturing, electrical issues, lithographic issues, and circuitry. Then At block E128, resolution enhancement is performed which involves geometric manipulations of the layout to improve manufacturability of the design. Mask data preparation, E130, then provides the tape-out data for production of masks to produce finished chips. Fabrication 450 produces integrated circuits. The integrated circuits are packaged and assembled, at block 460, and final integrated circuits at block 470.

The pessimism reduction in the evaluation of blocks described herein may be implemented at the design planning stage (break out the design) E112, physical implementation E122, physical/timing verification E126.

Figure 5A:
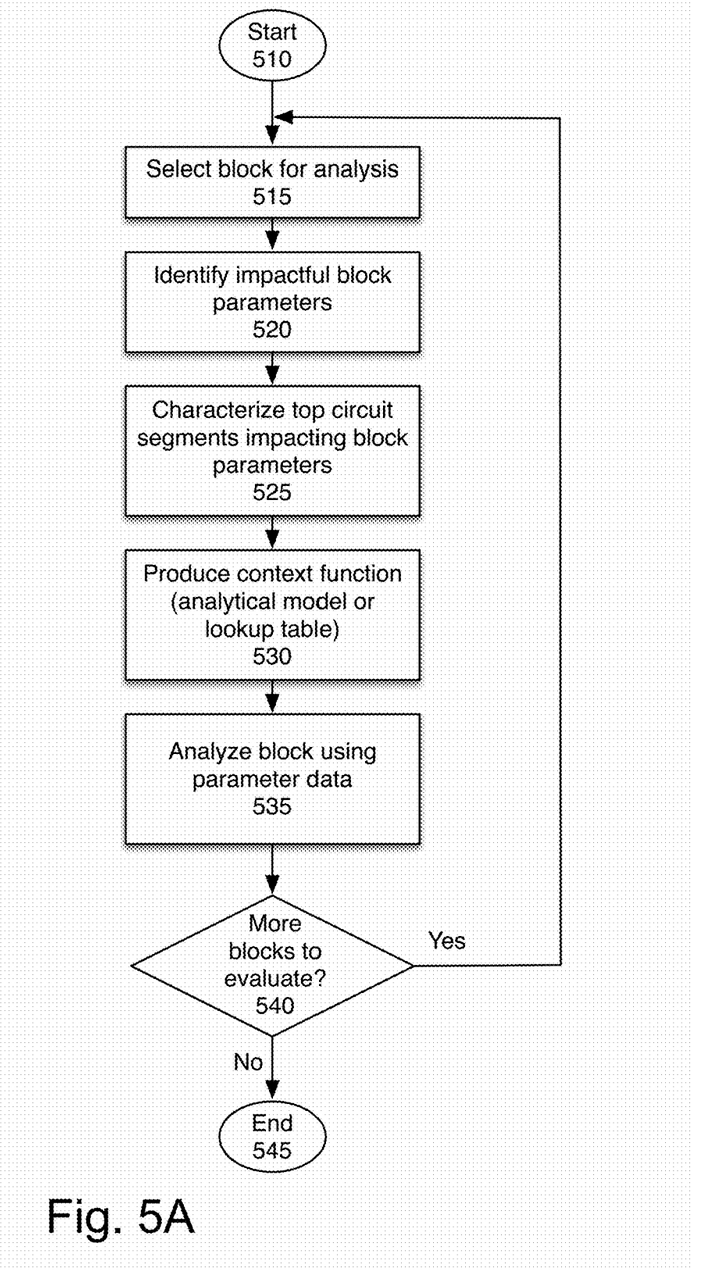
FIG. 5A is a flowchart of one embodiment of implementing the parameterized timing context.

FIG. 5A is a flowchart of one embodiment of generating and utilizing the parameterized timing context (PTC). The process starts at block 510. In one embodiment, the process starts when a hierarchical circuit design is received. The hierarchical circuit design includes a hierarchy of circuit blocks.

At block 515, a block is selected for analysis. The blocks can be represented as either full netlist or some form of abstraction (e.g. ETM, ILM, HyperScale models, QTM, blackbox, etc.)

At block 520, the block circuit parameters that impact top analysis are identified. These parameters may include logic depths, physical distances, topological overlap, logic convergence relationships, etc.

At block 525, the top circuit segments are characterized by sweeping the parameters. Sweeping the parameters comprises sampling a wide range of values for each parameter, and capturing context data for the wide range of values. The context data in one embodiment includes arrivals, latencies, noise injection, etc.)

At block 530, the context is produced as a function of the block parameters. The quick to evaluate functions in one embodiment are stored.

At block 535, this parameter data characterizing the top circuit segment is used in the analysis of the block. The segments that are at the top level and outside the current block are represented by the quick-to-evaluate functions of vital parameters of current block under analysis. These functions may be analytical models or lookup tables, etc. This provides evaluation of the selected block, without having the top level data in the analysis. Block analysis utilizes the parameterized contexts to achieve flat Quality of Results (QoR).

At block 540, the process determines whether the evaluated block has further top levels. In one embodiment, the PTC completes the hierarchical analysis loop through reverse characterization of chip-level contexts as functions of block circuit parameters, complementary to the traditional bottom-up modeling approaches such as standard cell characterization (Liberty) and macro extracted timing modeling (ETM), etc.

If there are further top levels, the process continues to block 515 to select the next block for evaluation. For this evaluation, the characterization of the lower level block is available. In this way, by looping through the process, the entire circuit can be characterized. The process shown is not limited to hierarchies with two levels, multiple levels of hierarchy can be covered easily through recursion or selected flattening, etc. The process the ends at block 545.

Figure 5B:
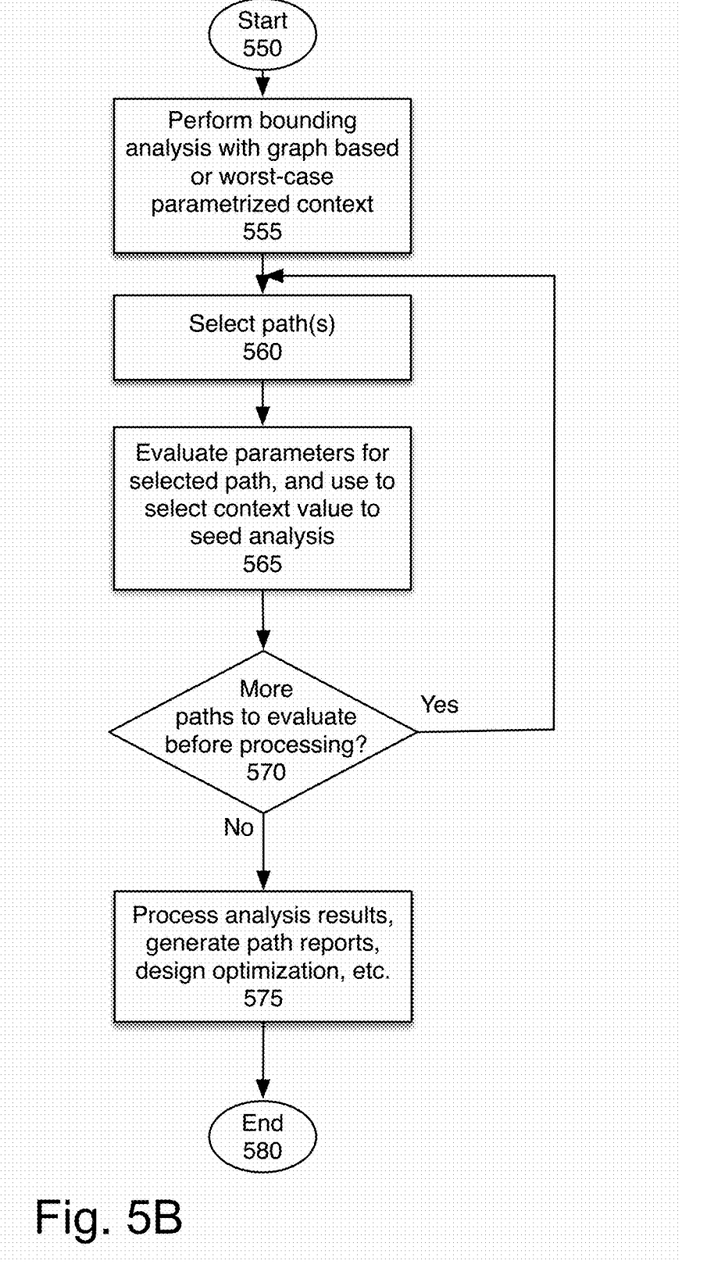
FIG. 5B is a flowchart of one embodiment of utilizing the context data.

FIG. 5B is a flowchart of one embodiment of utilizing the collected context data during the analysis of the block, also referred to as consuming the data. The process starts at block 550.

At block 555, as the initial values to perform block analysis, either 1) user provided values (e.g. timing budgets), or 2) the graph-based top level values (e.g. GBA timing contexts), or 3) the worst case bounding across the parameterized contexts is applied. Using 3) can reduce pessimism in graph based analysis results which is further used to guide or select paths for path based analysis.

At block 560, a specific path (or plural of paths), are targeted to evaluate the parameters according to the characteristics of the path(s) and specific values for each parameter are determined from this evaluation. These path specific parameter values are then used to evaluate the context data in order to select the exact context value to seed the analysis of the said path(s). In one embodiment, the evaluation of the parametric contexts with specific values can use any or a combination of the following methods:

1) compute as closed-form functions,
2) lookup the context as linear (or non-linear) table lookup,
3) fitting of the data with linear or non-linear piecewise interpolation or extrapolation.

At block 570, the process determines whether there are more paths to evaluate. In one embodiment, all paths are evaluated prior to processing the analysis results. In another embodiment, analysis and reporting may be done for each path or group of paths. If more paths should be evaluated prior to the analysis, the process returns to block 560 to select a next path (or next set of paths). Different paths starting from the same data or clock entry ports may show different path starting values when going through path based analysis, as a result of looking up the parameterized context with different path specific parameter values.

At block 575 the computed paths are processed to drive downstream analysis such as timing report generation, design optimization, etc. The process then ends for any given block with the parameterized context, at block 580. In one embodiment, this process is utilized for each lower level block characterization.

The characterization described above may be used for characterizing timing impacts of the top block on the block to be evaluated. The below examples, provided in FIGS. 6-12 provide specific examples of deriving the characterization for timing analysis. One of skill in the art would understand that a similar characterization may be utilized for analyzing power consumption, noise, and other circuit characteristics.

Figure 6:
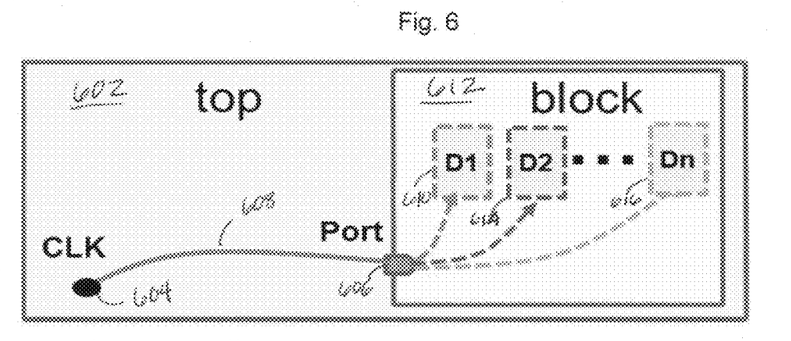
FIGS. 6-12 are diagrams of embodiments of a parameterized timing context (PTC) illustrating the characterization of top circuit level context.

FIG. 6 is a block diagram of an illustrative embodiment of a parameterized timing context (PTC) diagram illustrating the characterization of top circuit level context as functions of block circuit level parameters in a hierarchical circuit design.

One embodiment of parameterized timing context (PTC) is illustrated by reverse characterizing top circuit level 602 path segment 608 based on timing context by configuring a parameter sweep on clock path arrival from clock port 606 to clock source 604 and top circuit 602 level clock path segment 608. The block circuit level 612 metric values 610, 614, 616 are selected that impact top circuit level 602 path segments. The top circuit level 602 path segment 608 is reverse characterized by sweeping the parameters and covering a wide range of values for each parameter of the top circuit level 602 clock path segment 608 of block circuit level 612.

In another embodiment, the one or more block circuit level 612 may be one or more sub-parts within the one or more circuit blocks. In another embodiment, the block circuit level 612 may be multiple blocks or any combination of a block circuit, one or more block circuits, multiple blocks, a hierarchy of blocks, or sub-parts within the block circuit, one or more block circuits, multiple blocks or a hierarchy of blocks.

In one embodiment, the block circuit level 612 parameters may be any parameter that is a function of the top circuit level. In one embodiment, the block circuit level 612 parameters are the parameters impacting a top circuit level 602 analysis of the electrical circuit. In one embodiment, these parameters may be logic depth, distance, physical distance, topological overlap, and logic convergence relationships.

The clock path segment 608 arrival parameters include any parameters that affect the timing context of the circuit, including frequency, noise, timing, temperature, power, clock skew, and jitter. FIG. 6 is simplified for clarity. One of ordinary skill in the art would readily recognize that there are many top circuit level 602 path segments, each of which has a clock pair (launch and capture).

Figure 7:
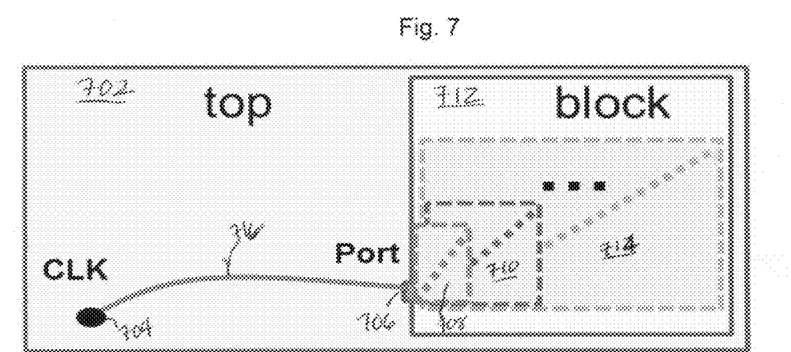

FIG. 7 is a block diagram of one embodiment of an illustrative parameterized timing context (PTC) diagram illustrating the characterization of top circuit level 702 context as functions of block circuit level 712 parameters in a hierarchical integrated circuit design. In FIG. 7, the accurate physical size (bounding box or distance, etc.) information of the top circuit level 702 path segment 716 is sent through context to one or more block circuit levels 712. One or more block circuit levels 712 may be one block circuit level, multiple block circuit levels, and hierarchies of block circuit levels.

FIG. 7 illustrates reverse characterization of the top circuit level 702 path segment 716 based on timing context through parameter sweeping and indexing selected block circuit level parameters. The block circuit level path segments take specific parameter values for each path segment from clock port 706 to clock source 704. In one embodiment, the parameter values selected are parameter values impacting the top circuit level 702 analysis.

Figure 8:
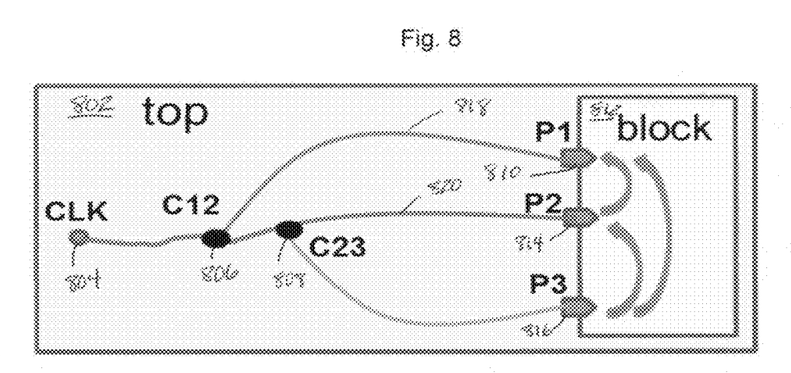

The accurate and exact parameter values of block level circuit is not needed, context information of the top circuit level 608 (or 708) is computed for a practical range of parameter values and the context data is sent to the one or more block circuit levels 612 (or 712). For example, the top circuit level 602 does not need to know the exact path depth of the block circuit level 612 logic paths; the top circuit level 702 does not need to know the exact shape, area of dimensions of the block circuit level 712 logic paths. In one embodiment, multiple lookup tables and/or form fitting formulas are generated to devise a set of corresponding latency values of top circuit level 802 path segment values to depth values.

For example:

| Parameter Values (e.g. path depth, or distance, etc.) | Context Values (e.g. clock latency) |
|---|---|
| p1 | c1 |
| p2 | c2 |

It is unnecessary to pre-scan all registers at of all the one or more block circuit level 612 (or 712) to find all the potential entry values for the latency table. When generating the latency table, a depth range is specified which has a smaller step at a smaller value and larger steps at larger values as in the table set forth below. For example:

| Parameter Values (e.g. path depth, distance, etc.) | Context values (e.g. clock latency) |
|---|---|
| 1 | Lat1 |
| 2 | Lat2 |
| 3 | Lat3 |
| 5 | Lat4 |
| 10 | Lat5 |
| n | Latn |

The actual values of the parameters and therefore the size of the tables may be dynamic and adaptive based on the physical characteristics of the parameter and the timing effects being modeled. For example, the OCV derating factor has a "saturation" characteristic which scarcely increases when the depth value increases beyond a certain point in block circuit layer 612 (or 712). This characteristic reduces the number of calls to latency computation functions, which is highly parallelizable. In one embodiment, the latency tables are then written to context. The one or more block circuit levels 612 (or 712) utilize the lookup tables or form-fitting formulas to lookup the corresponding latencies of the launch and capture paths for each clock pair.

In a hierarchical integrated circuit design with a large and complex top circuit level surrounding one or more block circuit levels, the top circuit level and block(s) circuit level analysis are mutually dependent. For example, the block(s) circuit level is dependent on the frequency, noise, timing, temperature and power of the top circuit level. In addition, there are also context factors such as clock skew and jitter. In one embodiment, the contexts at the block circuit level are not scalar values but functions of specific block circuit parameters and do not take single values but discreet or continuous values spread across the applicable ranges.

FIG. 8 is a block diagram of an illustrative parameterized timing context (PTC) diagram illustrating the characterization of top circuit level context as functions of block level parameters in a hierarchical circuit design. FIG. 8 illustrates top circuit level 802 and a block circuit level 812 of a hierarchical integrated circuit (not shown). Top circuit level 802 has clock source CLK 804, clock ports P1 810, P2 814, P3 816, and common points (CMP) C12 806, C23 808. The block circuit level 812 is an abstract illustration of the possible clock paths between logic depth, distance, physical distance, topological overlap, logic convergence relationships or any parameter that is a function of the top circuit level.

FIG. 8 illustrates an embodiment of characterizing parameterized contexts by identifying and indexing top circuit level 802 path segment 822 through backward tracing of each clock port P1 810, P2 814, P3 816 per each clock source CLK 804 launch 818 and capture 820 common points C12 806, C23 808. Identifying and indexing top circuit level 802 path segment through backward tracing and tracing the path segment 822 enables performing path based analysis (PBA) to account for common points C12 806, C23 808 to determine encoded topological correlation.

Topological correlation includes common point per clock pair CMP C12 806, C23 808, clock path reconvergence, point-of divergence, etc. Clock path reconvergence in PBA is defined as optimistic reconvergence, the PBA using the same offset for the part of the clock-tree common to both flip flops. However, any clock structure may be used in the present disclosure as clock tree network in top circuit layer 802. For example, a master clock, clock spines, meshes, or random clocks.

In one embodiment, the circuit block designer may use the one or more block circuit levels 812 without the top circuit level being present at the time of design. In one embodiment, the block circuit level designer provides a list of all data points, i.e. parameters, for which the one or more block circuit level must be designed and verified for. The top circuit level and the one or more block circuit levels are highly coupled and mutually dependent. The top circuit level 802 designers cannot fully describe the contexts without knowing all the details of one or more block circuit level 812 parameters. A subset of one or more block circuit level 812 parameters is selected and for each parameter, the expected values and/or value ranges is specified. In one embodiment, the values are not fixed but parameterized. The top circuit level 802 parameters are characterized as data points determined by the block circuit level 812 characteristics.

Figure 9:
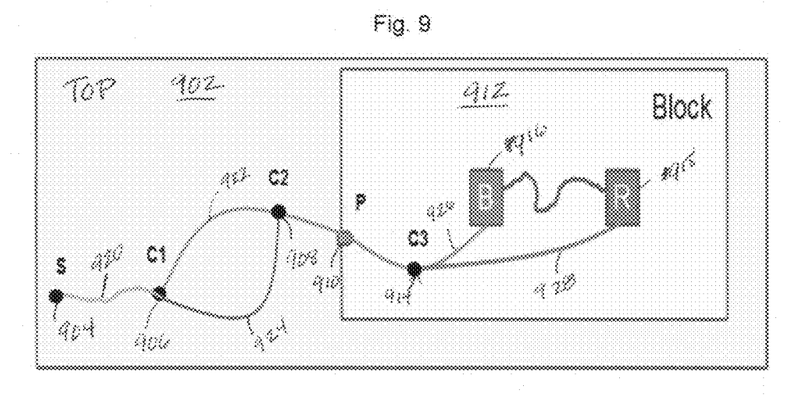
Figure 10:
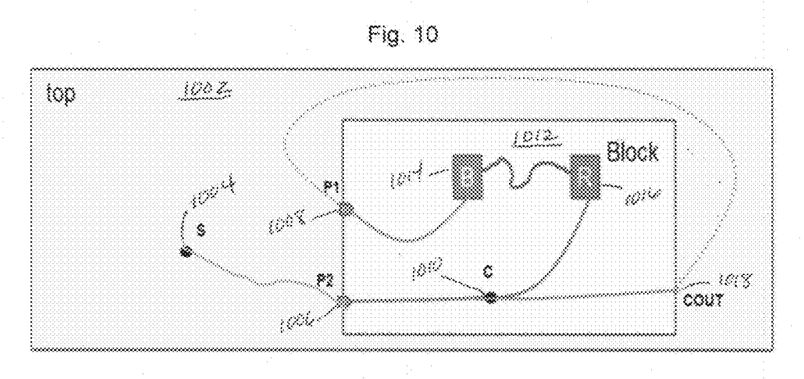

FIG. 9. is a block diagram of an illustrative example of one embodiment of a parameterized timing context (PTC) diagram illustrating the characterization of top circuit level 902 when the common point C3 914 is inside the block circuit level 912 and from a single clock port 910 in a hierarchical circuit design. In FIGS. 9 and 10, the analysis is a path based analysis path which has clocks from the same port.

In FIG. 9, the reconvergence path at top circuit level 902 does not introduce pessimism. Two cells cannot have two instances of delay at the same time. For example, if launch clock common path has a delay of 128 ps and capture clock common path has a delay of 102.4 ps, the additional pessimism is 25.6 ps. To deal with the additional "25.6 ps", it is 1) added it in "Data required time" OR 2) subtracted from "Data arrival time" because, the "delays" in common path have to be the same.

In one embodiment, some pessimism is introduced at C1 due C1 906 calculated clock path convergence (CRPR) for C1 906 while C3 914 is advanced on chip variation (OCV) at common point 914 and graph based analysis values are used at clock port P 910 because it is in block circuit level 912.

FIG. 9 shows source clock S 904, common path 920, launch path 922, divergent path 924, CMP C2 908, port P 908 which has common path to CMP C3 914 at which point launch path 926 diverges to B 916 and R 918 capture path returns to CMP C914. Because the common point C3 913 is inside the block circuit level 912 some residual pessimism occurs due to the calculated clock path convergence (CRPR) for C1 906, while C3 914 is advanced on chip variation (OCV) at common point 914 and graph based analysis values are used at clock port P 910.

FIG. 10 is a block diagram of an illustrative example of another embodiment of a parameterized timing context (PTC) diagram illustrating the characterization of top circuit level 1002 when common point 1010 is inside the block circuit level 1012 and from single clock port P1 1006 in a hierarchical circuit design. FIG. 10 illustrates an embodiment of relevant case of re-use of the advanced on chip variation (OCV) common point context for connection Cout, Cout 1018→P1 1008. Identifying and indexing top circuit level 1002 path segment through backward tracing of clock port P1 1008, P2 1006 per each clock source CLK 1004. In this embodiment, re-use the common path reconvergence (CRPR) context for connection Cout 1018 cout→P1 1008 and also capture the depth and latency table for this portion of the path. This information is combined with the delay information of C 1010→Cout 1018 and P11008→B 1014 for accurate analysis.

Figure 11:
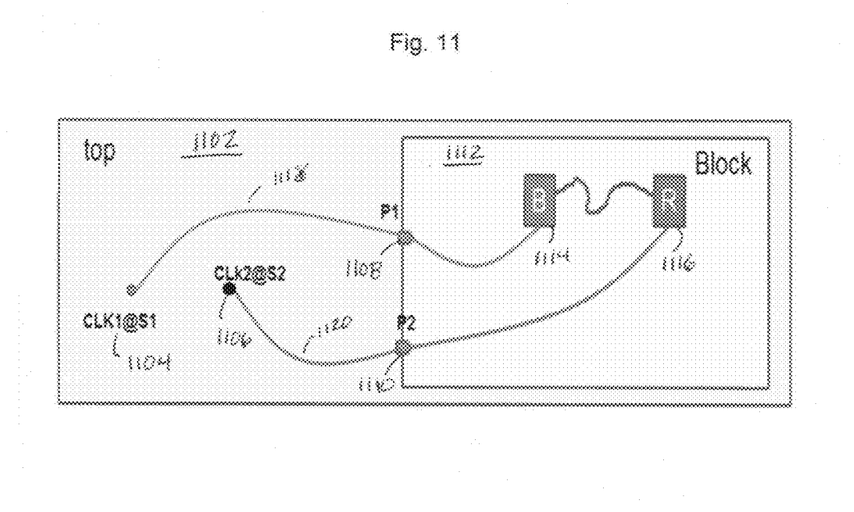
Figure 12:
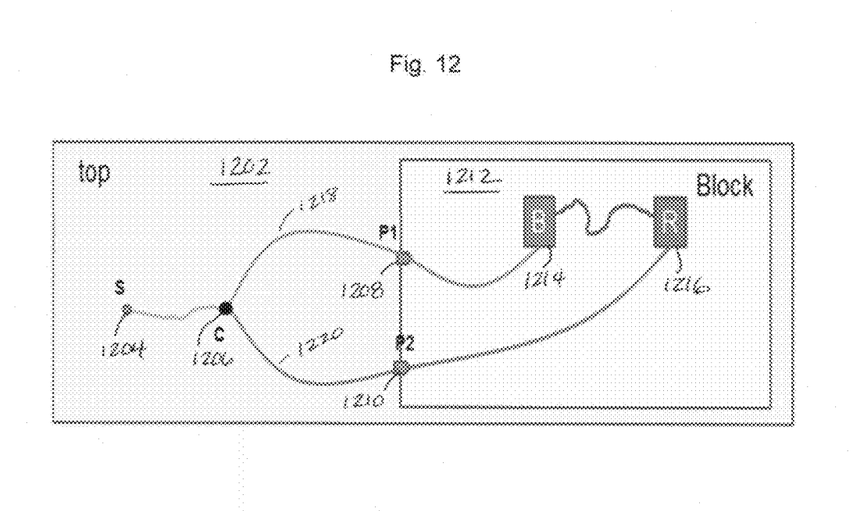

FIG. 11 is a block diagram of another embodiment of a parameterized timing context (PTC) diagram illustrating the characterization of top circuit level 1102 when there is no common point. In FIGS. 11 and 12, the analysis is a path based analysis path which has clocks from two ports. FIG. 11 illustrates an embodiment of launch clock S1 1104 and capture clock S2 1106. The launch clock S1 1104 and capture clock S2 1106 clock paths 1118, 1120 enter block circuit level 1112 through clock port P1 1108 and clock port P2 1110. At top circuit level 1102 it is possible that clock paths 1118, 1120 are from launch clock S1 1104 and capture clock S2 1104 with no common point as illustrated in FIG. 11, or it is possible that the there is a common point as illustrated in FIG. 12.

FIG. 12 is a block diagram of another embodiment of a parameterized timing context (PTC) diagram illustrating the characterization of top circuit level when the common point is inside the block circuit level. From timing analysis perspective, a clock launch path 1218 enters into block 1212 at port 1208 (P1) and capture path 1212 enters block 1212 through port 1210 (P2). The launch and capture paths share a common segment from clock source 1204 (S) and diverge at point C 1206. In STA this shared common network between launch and capture paths can result in pessimism in the analysis. In one embodiment, clock reconvergent pessimism removal (CRPR) techniques are employed to recover the pessimism. The CRPR effects in the chip level contexts may be accounted for by providing the context as more than one clock port at the block boundary (i.e. P1 and P2).

The latency table in context may depend on the clock port pair. For example, in the embodiment illustrated in FIG. 12, analyzing the path based analysis (PBA) path with launch path 1218 through clock port P1 1208 and capture path 1220 through clock port P2 1210, the first step is to find the maximum (launch) top-level top circuit level 1202 graph based analysis (GBA) path to clock port P1 1208 and the minimum (capture) top-level top circuit level 1202 graph based analysis (GBA) path to clock port P2 1210. The common point C 1206 of the two paths is then determined.

There is a central assumption when determining the common point C 1206 that regardless of which path based analysis (PBA) data path is in the one or more block circuit level 1212, the top circuit level 1202 is always unique and predefined by graph based analysis (GBA). Thus, if there is another flip-flop pair that also has P1 1208 on the launch path 1218 and P2 1210 on the capture path 1220, common point C 1206 at top circuit level 1202 will always be the same.

In one embodiment, two latency tables can then be generated, T1 for P1 and T2 for P2, which are based on the corresponding depths of the top circuit level 1202 paths (C→P1 and C→P2) and the depths of the one or more block circuit level 1212 paths (P1→B and P2→R).

All possible depths of the one or more block circuit level 1212 paths may be referred, in one embodiment, to due to the possibility of different B', R', etc. In general, the derating table may become multi-dimensional and dependent on multiple signal ports or pins. In one embodiment, two latency tables can then be generated, T1 for P1 and T2 for P2, which are based on the corresponding depths of the top circuit level.

In one embodiment, if there are N clock ports in one or more block circuit levels, a total of quadratic number of tables may be generated to exhaustively cover all possible launch and capture path relations in the block. In practice, the number of tables can be reduced greatly based on design knowledge. Once these tables are generated and applied, there should not be any pessimism left in a scenario with two clock ports.

In one embodiment, during a second block level run, the context information is incorporated and the derating factor is looked up directly. Then the uncoupled delay of the block circuit level path is derated and added to with the top circuit level delay, which is from context.

Figure 13:
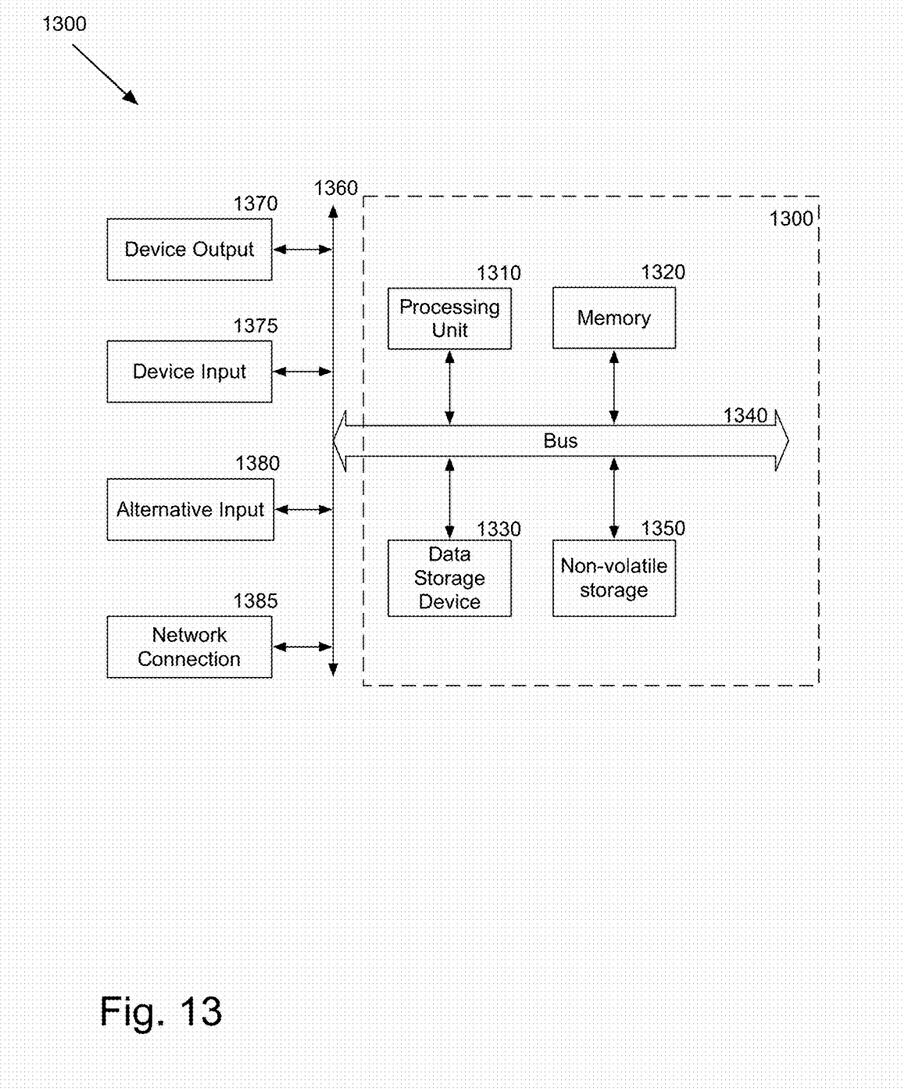
FIG. 13 is a block diagram of one embodiment of a computer system in which the various embodiments may be implemented.

FIG. 13 is a block diagram of an exemplary computer system in which various embodiments of the present disclosure may be implemented. Data processing system 1300 is one example of a suitable data processing system and is not intended to suggest any limitation as to the scope of use or functionality of the embodiments described herein. Regardless, data processing system 1300 is capable of being implemented and/or performing any of the functionality set forth herein such as parameterized timing contextualized analysis.

Computer system/server 1300, may work with numerous other general purpose or special purpose computing system environments, peripherals, or configurations. Examples of well-known computing systems, environments, and/or configurations that may be suitable for use with computer system/server 1300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1300 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1300 may be practiced in distributed computing environments where tasks are performed by remote processing devices that are linked through a communications network. In a distributed computing environment, program modules may be located in both local and remote computer system storage media including memory storage devices.

The components of computer system/server 1300 may include, but are not limited to, one or more processors or processing units 1310, a system memory 1320, and a bus 1340 that couples various system components including system memory 1320 to processor 1310.

Bus 1340 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1300 typically includes a variety of non-transitory computer system usable media as data store 1330. Such media may be any available media that is accessible by computer system/server 1300, and it includes both volatile and non-volatile media, removable and non-removable media.

System memory 1320 can include non-transitory computer system readable media in the form of volatile memory, such as random access memory (RAM) 230 and/or cache memory. Computer system/server 1300 may further include other non-transitory removable/non-removable, volatile/non-volatile computer system storage media 1330. By way of example, storage system 1330 can be provided for reading from and writing to a non-removable, non-volatile magnetic media (not shown and typically called a "hard drive").

Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 1340 by one or more data media interfaces. Memory 1320 may include at least one program product having a set (e.g., at least one) of program modules that are configured to carry out the functions of the embodiments. Memory 1320 may also include data that will be processed by a program product.

Program/utility, having a set (at least one) of program modules, may be stored in memory 1320 by way of example, as well as an operating system, one or more application programs, other program modules, and program data. Each of the operating system, one or more application programs, other program modules, and program data or some combination thereof, may include an implementation of a networking environment. Program modules generally carry out the functions and/or methodologies of the embodiments. For example, a program module may be based on parameterized timing contextualized analysis.

Computer system/server 1300 may also communicate with one or more external devices such as a keyboard, a pointing device, a display, etc.; one or more devices that enable a user to interact with computer system/server 1300; and/or any devices (e.g., network card, modem, etc.) that enable computer system/server 1300 to communicate with one or more other computing devices. Such communication can occur via I/O interfaces 1370, 1375 through wired connections or wireless connections. Computer system/server 1300 can communicate with one or more networks such as a local area network (LAN), a general wide area network (WAN), and/or a public network (e.g., the Internet) via network connection 1385. Network connection 1385 communicates with the other components of computer system/server 1300 via bus 1360. It should be understood that although not shown, other hardware and/or software components could be used in conjunction with computer system/server 1300. Examples, include, but are not limited to: microcode, device drivers, tape drives, RAID systems, redundant processing units, data archival storage systems, external disk drive arrays, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method performed by a data processing system of evaluating a hierarchical circuit design stored in a memory of the data processing system, comprising:
   identifying a block for evaluation, the block located below a top level block in a hierarchy;

identifying parameters impacting the block, wherein the parameters comprise at least one of: logic depths, physical distances, topological overlap, and logic convergence relationships;
characterizing the top level block's impact on the parameters;
producing a context function representing the top level block's impact; and
utilizing the context function in analyzing the block,
wherein characterizing the top level block's impact on the parameters further comprises:
computing top circuit level properties by characterizing top circuit level path segments through running parameter sweep analysis of each of the one or more block circuit level parameters values and capturing top circuit level context data; and
wherein producing a context function representing the top level block's impact further comprises producing parameterized timing context data from the computed top circuit level properties and defining a relationship of the each of the one or more block circuit level parameters and their corresponding context data values; and
wherein utilizing the context function in analyzing the block further comprises utilizing the parameterized timing context data with one or more block circuit design to measure one or more block circuit design parameter values.

2. The method of claim 1, wherein the at least one or more parameters impacting the block further comprise: frequency, noise, timing, temperature and power.

3. The method of claim 1, wherein the context function comprises one of an analytical mode or a lookup table.

4. The method of claim 1, wherein the characterizing of the top level block comprises running parameter sweep analysis for a plurality of parameter values and capturing top circuit level context data.

5. The method of claim 1, wherein the parameters comprise one or more of: timing parameters, noise parameters, and power parameters.

6. A parameterized timing context method, performed by a data processing system, for improving analysis of a hierarchical integrated circuit design in an electrical circuit, stored in a memory of the data processing system, having one or more block circuit levels and a top circuit level, the method comprising:
determining each of one or more block circuit parameters in the one or more block circuit levels impacting a top circuit level analysis of the electrical circuit;
computing top circuit level properties by characterizing top circuit level path segments through running parameter sweep analysis of each of the one or more block circuit level parameters values and capturing top circuit level context data;
producing parameterized timing context data from the computed top circuit level properties and defining a relationship of the each of the one or more block circuit level parameters and their corresponding context data values; and
utilizing the parameterized timing context data with one or more block circuit design to measure one or more block circuit design parameter values.

7. The method of claim 6, wherein the one or more block circuit level parameters in the one or more block circuit levels impacting a top circuit level analysis of the electrical circuit comprise: logic depth, shape, physical distance, topological overlap, and logic convergence relationships.

8. The method of claim 7, wherein the one or more block circuit level parameters comprise any parameter that is a function of the top circuit level.

9. The method of claim 6, wherein capturing top circuit level context data includes at least one or more timing parameters impacting the top circuit level.

10. The method of claim 9, wherein the at least one or more timing parameters impacting the top circuit level further comprise: frequency, noise, timing, temperature and power.

11. The method of claim 9, wherein the at least one or more timing parameters impacting the top circuit level further comprise: clock signal latencies, skews, data signal arrivals.

12. The method of claim 6, wherein producing parameterized context data from the top circuit level properties as functions of block circuit level parameters and their corresponding context data values further comprises:
formulating one or more close-form formulas indexed in a plurality of multi-dimensional lookup tables.

13. The method of claim 6, wherein producing parameterized context data from top circuit level properties as functions of block circuit level parameters and their related corresponding context data values further comprises:
formulating one or more close-form formulas indexed in a plurality of curve-fitting lookup tables.

14. The method of claim 6, further comprising:
utilizing the parameterized timing context data with one or more block design circuits to measure one or more block design circuit parameter values one or more times, and
looking up a derating factor directly from top circuit level parameterized context timing data derived from block circuit parameters.

15. The method of claim 6, further comprising:
using a worst case bounding across the parameterized timing contexts as initial values during block level analysis.

16. The method of claim 6, further comprising:
evaluating the parameters for a selected specific path to determine path specific parameter values; and
using the path specific parameter values to select a context value to seed the block level path based analysis.

17. The method of claim 16, further comprising:
the evaluation of the parameters for the selected specific path utilizes one or more of:
closed-form functions,
linear table lookup,
non-linear table lookup,
fitting data with piecewise interpolation, and
fitting the data with piecewise extrapolation.

18. The method of claim 16, wherein different paths starting from a data or clock entry port have different path starting values.

19. A computer system to evaluate parameterized timing context for improving analysis of a hierarchical integrated circuit design in an electrical circuit having one or more block circuit levels and a top circuit level, the method comprising:
a top level circuit analysis logic identify one or more block circuit parameters in the one or more block circuit levels impacting a top circuit level analysis of the electrical circuit, and to compute top circuit level properties by characterizing top circuit level path segments through running parameter sweep analysis of each of the one or more block circuit level parameters values and capturing top circuit level context data;

a parameterized context logic to produce parameterized timing context data from the computed top circuit level properties and defining a relationship of the each of the one or more block circuit level parameters and their corresponding context data values; and a block evaluation logic to utilize the parameterized timing context data with one or more block circuit design to measure one or more block circuit design parameter values.

20. The system of claim 19, wherein the one or more block circuit level parameters in the one or more block circuit levels impacting a top circuit level analysis of the electrical circuit comprise: logic depth, shape, physical distance, topological overlap, and logic convergence relationships.

21. The system of claim 19, wherein the parameterized context logic producing the parameterized timing context utilizes one or more of:

closed-form functions,
linear table lookup,
non-linear table lookup,
fitting data with piecewise interpolation, and
fitting the data with piecewise extrapolation.

* * * * *